US012681548B2

(12) United States Patent
    Dai et al.

(10) Patent No.: US 12,681,548 B2
(45) Date of Patent: Jul. 14, 2026

(54) UNDERSIZED ADAPTER FOR WORKLOAD POWER DEMAND

(71) Applicant: Hewlett-Packard Development Company, L.P., Spring, TX (US)

(72) Inventors: Fangyong Dai, Spring, TX (US); Jon Gregory Lloyd, Spring, TX (US); Galilea Olvera Sanchez, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 100 days.

(21) Appl. No.: 18/466,428

(22) Filed: Sep. 13, 2023

(65) Prior Publication Data

US 2025/0085754 A1     Mar. 13, 2025

(51) Int. Cl.
    *G06F 1/3212*        (2019.01)
    *G06F 1/26*          (2006.01)
(52) U.S. Cl.
    CPC ................................... *G06F 1/263* (2013.01)
(58) Field of Classification Search
    CPC ....... G06F 1/263; G06F 1/3203; G06F 1/3212
    See application file for complete search history.

(56) References Cited

U.S. PATENT DOCUMENTS

| | | | |
|---|---|---|---|
| 8,531,060 B2 | 9/2013 | Chang et al. | |
| 2005/0007798 A1 | 1/2005 | Chen | |
| 2006/0082960 A1* | 4/2006 | Breen ..................... | G06F 1/263 |
| | | | 361/679.01 |
| 2007/0007822 A1 | 1/2007 | Cioaca et al. | |
| 2007/0229024 A1* | 10/2007 | Li ........................... | G06F 1/263 |
| | | | 320/111 |
| 2013/0232349 A1* | 9/2013 | Oler .......................... | G06F 1/26 |
| | | | 713/300 |
| 2016/0261132 A1 | 9/2016 | Uan-Zo-Li | |
| 2021/0089105 A1* | 3/2021 | Iyer ......................... | G06F 1/263 |
| 2022/0231532 A1* | 7/2022 | Sultenfuss .............. | H02J 7/163 |
| 2023/0409100 A1* | 12/2023 | Chauhan .................. | G06F 1/26 |

* cited by examiner

*Primary Examiner* — Jaweed A Abbaszadeh
*Assistant Examiner* — Gayathri Sampath
(74) *Attorney, Agent, or Firm* — Quarles & Brady LLP

(57)                ABSTRACT

An example non-transitory machine-readable storage medium includes instructions executable by a processing resource of an electronic device. The instructions cause the electronic device to determine that a power adapter attached to a power port of a computing device has an adapter power rating that is less than a nominal power rating of the computing device, determine a workload power demand of the computing device, and select a power source for the computing device based on the workload power demand, wherein the power source is selected from the power adapter or a battery of the computing device.

20 Claims, 4 Drawing Sheets

100

200

202 — DETERMINE THAT POWER ADAPTER IS UNDERSIZED

204 — DISABLE ADAPTER PRESENCE SIGNAL

206 — SEND ALTERNATIVE BATTERY SIGNAL TO ADAPTER INTERFACE

*400*

402 — DETERMINE ADAPTER IS UNDERSIZED

404 — DETERMINE ADAPTER HAS POWER RATING THAT MEETS WORKLOAD POWER DEMAND

406 — ENABLE ADAPTER TO POWER COMPUTER SYSTEM AS BATTERY

UNDERSIZED ADAPTER FOR WORKLOAD POWER DEMAND

BACKGROUND

High-performance computing devices (e.g., gaming laptops, mobile workstations) typically require high-rating AC adapters to meet system power demands and charge an internal battery. These power adapters, mostly ranging from 200 W-300 W in power capacity, are usually bulky or heavy, and can make traveling difficult. Although undersized power adapters with lower power capacity may be capable of powering certain processes, they are typically blocked from powering a computing device in an active state.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

Figure 1:
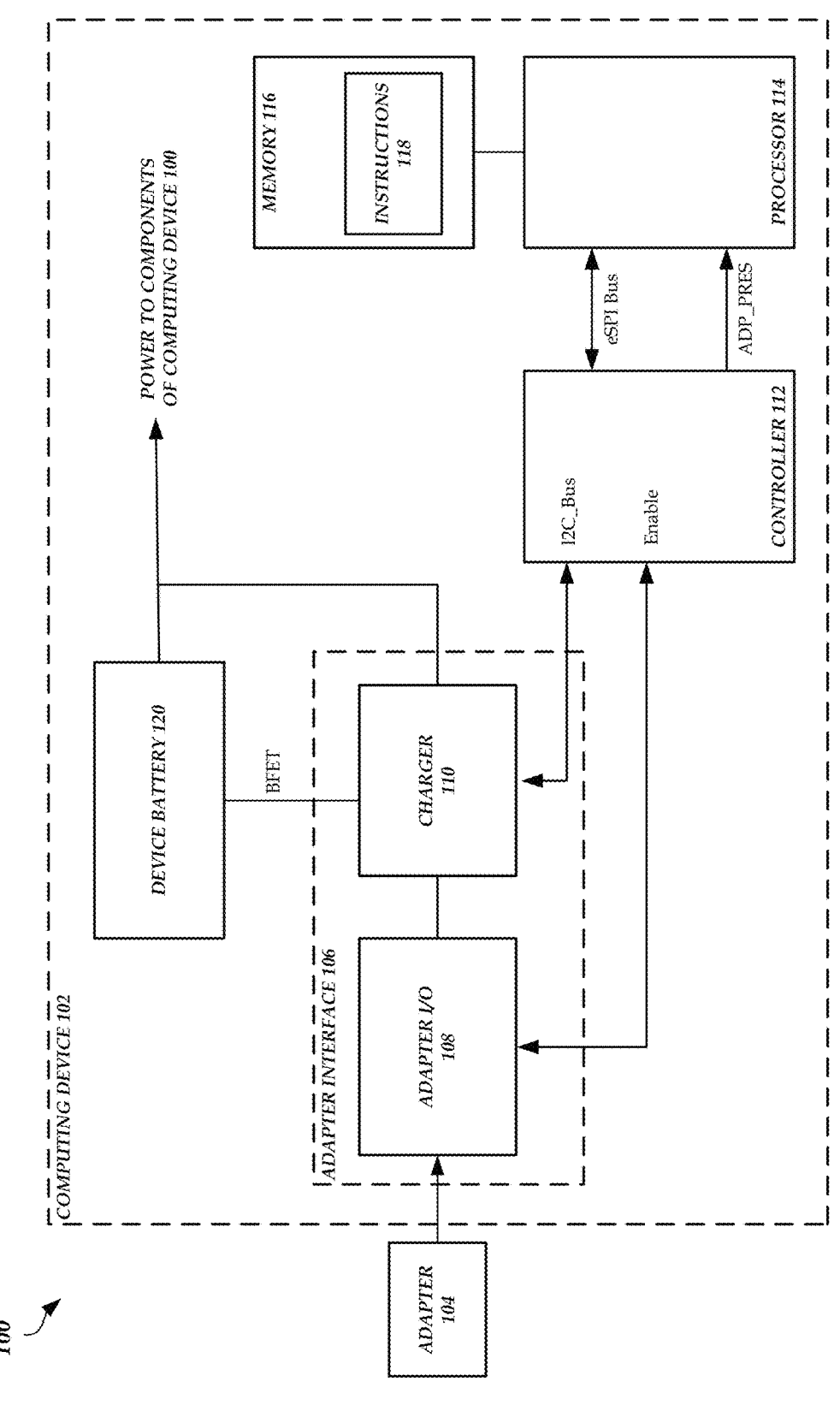
FIG. 1 illustrates a block diagram of a computing device that enables an undersized power adapter to power the computing device.

Undersized power adapters are typically blocked or disabled from powering high-performance computing devices. Although undersized adapters may have an adapter power rating that is less than a nominal power rating of the computing device, undersized adapter may still be used to power certain processes on the computing device and even charge a device battery.

Examples of the present disclosure relate to systems and methods for enabling an undersized adapter to power a computing device. In some examples, the techniques described herein relate to a method, comprising: determining that a power adapter attached to a power port of a computing device has an adapter power rating that is less than a nominal power rating of the computing device; determining a workload power demand of the computing device; and selecting a power source for the computing device based on the workload power demand, wherein the power source is selected from the power adapter or an internal battery of the computing device.

In some examples, the power adapter is selected as the power source, enabling the power adapter to power the computing device as an alternative battery. In some examples, the internal battery is selected as the power source, disabling power input from the power adapter.

In some examples, the workload power demand includes a present workload power demand and an upcoming workload power demand. In some examples, the workload power demand is based on a workload type, wherein the workload type includes a computing device state change, a process, or an application.

In some examples, selecting the power source for the computing device based on the workload power demand comprises determining whether the power adapter has an adapter power rating that meets the workload power demand. In some examples, in response to a determination that the power adapter has an adapter power rating that is less than the workload power demand, selecting the internal battery as the power source. In some examples, selecting both the power adapter and the internal battery as the power source during a transition period.

In some examples, the techniques described herein relate to a computing device comprising: a power port; a chipset; a controller to: determine that a power adapter is attached to the power port, wherein the computing device has a nominal power rating; determine that the power adapter has an adapter power rating that is less than the nominal power rating; suppress an adapter presence signal to the chipset, wherein the adapter presence signal indicates that the power adapter is attached to the power port of the computing device; and send an alternative battery presence signal to the chipset to cause the computing device to identify the power adapter as an alternative battery.

In some examples, the alternative battery presence signal indicates to an operating system of the computing device that the power adapter is an alternative battery power source. In some examples, the controller is to: determine a workload power demand of the computing device; and select the power adapter as a power source for the computing device when the workload power demand is less than a threshold. In some examples, the workload power demand includes a present workload power demand and an upcoming workload power demand.

In some examples, a graphics processing unit (GPU), wherein the GPU is to operate at a throttled performance level when the power adapter is selected as the power source. In some examples, the controller is to: monitor the workload power demand; and disable the power adapter when the workload power demand is higher than the threshold. In some examples, an internal battery, wherein the controller is to select the internal battery as the power source when the workload power demand is higher than the threshold.

In some examples, the techniques described herein relate to a non-transitory computer-readable storage medium comprising instructions that when executed cause a controller of a computing device to: determine that a power adapter attached to a power port of a computing device has an adapter power rating that is less than a nominal power rating of the computing device; determine that the power adapter has an adapter power rating that meets a workload power demand; and identify the power adapter as a battery to the computing device to power the computing device.

In some examples, the instructions when executed further cause the controller to suppress a signal that identifies the power adapter as a power adapter. In some examples, the workload power demand includes a present workload power demand and an upcoming workload power demand. In some examples, the non-determine power source for the computing device based on the workload power demand comprises determining whether the power adapter has an adapter power rating that meets the workload power demand.

In some examples, the instructions when executed further cause the controller to: monitor a workload power demand of the computing device; determine that the power adapter has an adapter power rating that is less than the workload power demand; and switch a power source of the computing device from the power adapter to a battery of the computing device.

FIG. 1 illustrates a block diagram of a computing system 100 that enables an undersized power adapter to power the computing device. As shown in FIG. 1, computing system 100 includes computing device 102 and undersized power adapter 104.

In some embodiments, undersized power adapter 104 may be any power adapter, such as a laptop charger, configured to provide power to operate the computing device 102 and to charge a device battery 120. In some embodiments, undersized power adapter 104 may be an alternating current (AC) power adapter. In some examples, undersized power adapter 104 may be any power adapter configured to output a range of power levels, such as 200 W, 240 W, 300 W, etc.

In some embodiments, undersized power adapter 104 may be undersized, underrated. As used herein, a power adapter characterized as undersized may refer to a power adapter that is configured to supply current at a level lower than a level supported by the computing device specifications. For example, a 240 W power adapter would be considered "undersized" if it were plugged into a computing device with a specified 300 W standard operating current level requirement. In some examples, the undersized power adapter 104 is undersized when the undersized power adapter 104 has a power rating that is less than a nominal power rating of the computing device 102.

Computing device 102 may be any device capable of executing processes typical of computing systems, such as personal computing devices, laptop computing devices, gaming computing devices, tablet computing devices, streaming media devices, and various other electronic devices and appliances. In some embodiments, computing device 102 may include various components typical of any computing device, laptop, mobile workstation, etc. For example, as shown in FIG. 1, computing device 102 may include an adapter interface 106, controller 112, processor 114, memory 116 with instructions 118, and device battery 120. Although not shown in FIG. 1, the computing device 102 may also include a chipset to handle flow of data between components of the computing device 102. In some examples, the chipset may be communicatively coupled to the processor 114.

As shown in FIG. 1, computing device 102 may include a device battery 120. In some embodiments, device battery 120 may be an internal battery that is located or disposed within a housing of computing device 102. In some examples, device battery 120 may be a hardware component that supplies power to a device, enabling that device to work without undersized power adapter 104. In some embodiments, device battery 120 may supply power to various components of computing device 102 as shown in FIG. 1.

As shown in FIG. 1, adapter interface 106 comprises adapter input/output (I/O) 108 and charger 110. Adapter I/O 108 may include an interface suitable to receive a connector of the undersized power adapter 104, such as barrel, USB-C, USB-A, Lightning, etc. In some embodiments, adapter I/O 108 may be a power port. Adapter interface 106 may also include a charger 110. In some examples, charger 110 may charge a device battery 120 of the computing device 102. For example, charger 110 may include a step-down transformer to decrease an input voltage and a rectifier to convert AC into DC. As shown, charger 110 may be communicatively coupled to device battery 120 to charge the device battery 120, such as through field-effect transistor (FET), such as a battery FET (BFET), or other connection/switch.

In some examples, controller 112 may be a control device, such as a microcontroller, configured to complete a certain task. As shown in FIG. 1, controller 112 may be communicatively coupled to various components of computing device 102, such as the adapter I/O 108 and charger 110 of the adapter interface 106, and the processor 114. In some examples, the controller 112 may communicate with a chipset of the computing device 102. In some examples, controller 112 may send and receive signals between various components of computing device 102 in order to accomplish various tasks.

In some examples, controller 112 may determine a workload of the computing device 102. As shown in FIG. 1, controller 112 may communicate with processor 114 via a bus, such as an enhanced serial peripheral interface (eSPI) bus, to send and receive information related to a workload of the computing device 102. In some examples, a workload of the computing device may refer to an amount of computing resources and/or a time needed to complete a task or generate an outcome. In some examples, a workload may be in the form of a workload power demand, referring to a required current level needed to sufficiently execute the workload. In some examples, a workload of computing device 102 may include a current workload, such as a list of current processes, applications, power states, etc. In some examples, a workload of a computing device 102 may refer to an upcoming workload, such as a power up, a power down, low power mode, etc. In addition, basic input/output (BIOS) and/or central processing unit (CPU) bus signals may be monitored in order to determine the present or upcoming workload. For example, if the discrete graphics processing unit (dGPU) is set to be turned on, a signal may be sent from the processor 114 to the controller 112. Therefore, the controller 112 may receive information related to an upcoming state change of the dGPU and adjust the power source accordingly. In some examples, the controller and/or processor 114 may communicate with the chipset of computing device 102 to receive data about the computing device 102, such as the workload.

In some examples, controller 112 may receive information from the adapter I/O 108 about undersized power adapter 104. For example, controller 112 may receive information about undersized power adapter 104, such as the power output level, current, voltage etc. In some examples, controller may enable or disable signals sent to the processor 114 and/or the adapter interface 106 based on received information.

In the context of a typical computing device 102 connected to a non-undersized power adapter (e.g., an adapter that is manufactured specifically to be connected to and power the computing device 102, a controller 112 may identify a undersized power adapter 104 connected to adapter I/O 108 and send an adapter presence signal (ADP_PRES) signal to the processor 114. This signal may inform processor 114 of the presence of a undersized power adapter 104 and prompt processor 114 to moderate the power source from undersized power adapter 104, rather than the device battery 120. However, in a typical case where the undersized power adapter 104 is undersized, ADP_PRES will still assert, indicating the presence of an undersized power adapter and further blocking the undersized power adapter from powering the computing device 102. In some examples, controller 112 may disable the ADP_PRES signal sent to the processor 114 to allow an undersized power adapter 104 to power the computing device 102 as an alternative or secondary battery source. In some examples, the undersized power adapter 104 may cause to controller 112 to receive a power rating for the undersized power adapter 104, such as through the adapter interface 106. In some examples, to allow the undersized power adapter 104 to power the computing device 102, the controller 112 may disable the ADP_PRES. This may, in some examples, inform the processor 114 and other components of computing device 102 that the power is coming from a battery source rather than an adapter power source, although the power source may actually be drawn from the undersized power adapter 104. Typically, when an undersized power adapter is connected to the computing device 102 and the ADP_PRES signal is sent to the processor 114, operations of the computing device 102 may be limited. For example, the types of operations or workload limits may be set by specifications of the computing device 102 and may be blocked automatically from being powered by the undersized power adapter. However, the processes described herein may allow an undersized power adapter 104 to power the computing device 102 as an alternative battery and avoid being categorized or blocked by the computing device 102. In this case, the undersized power adapter 104 may power the computing device 102 without limitations. For example, the undersized power adapter 104 may power processes and operations that would otherwise be powered by the internal battery of the computing device 102. In addition, the undersized power adapter 104 may perform (e.g., power the computing device 102) as a battery source rather than as an AC adapter. In some examples, controller 112 may send a signal prompting the adapter I/O 108 to allow the undersized power adapter 104 to charge the device battery 120 through charger 110. In some examples, computing device 102 includes a graphics processing unit (GPU), wherein the GPU is to operate at a throttled performance level when the undersized power adapter is selected as the power source. In some aspects, when the internal battery is selected as the power source, power input from the undersized power adapter may be disabled.

In some examples, the alternative battery presence signal indicates to an operating system of the computing device that the undersized power adapter is an alternative battery power source. For example, as described above, the controller 112 may disable the ADP_PRES typically sent to the processor 114 to indicate to the components of the computing device 102 of a presence of an undersized power adapter. Disabling the ADP_PRES may, in some examples, inform the processor 114 and other components of computing device 102 that the power is coming from a battery source rather than an adapter power source, although the power source may actually be drawn from the undersized power adapter 104. In some implementations, the undersized power adapter 104 may be displayed on a device manager panel as an alternative battery source. For example, the device manager panel may contain a list of components and/or devices associated with computing device 102. In some implementations, the alternative battery source may be displayed in an area of the device manager panel in which the internal battery source is also listed. In some examples, rather than being listed as a power adapter source, the undersized power adapter 104 may be listed as an alternative battery source, while there is no indication on the device manager panel of a connected adapter power source. In some examples, a user may view additional information related to the undersized power adapter 104, listed in the device manager panel as an alternative battery source. For example, a user may view the power capacity of the undersized power adapter 104, which may be listed in the device manager panel as the power capacity of an "alternative battery." In some examples, controller 112 may determine a power source for the computing device 102. In some examples, controller 112 may determine a power source between a connected undersized power adapter 104 and the device battery 120. In some examples, controller 112 may select the power source to be undersized power adapter 104 based on the undersized power adapter 104 has an adapter power rating that meets the workload power demand. In the case where the undersized power adapter 104 is selected as the power source, the charger 110 may output a voltage greater than the output voltage from the device battery 120. In doing so, the device battery 120 may not be disabled, however, power will be drawn from the undersized power adapter 104 instead of the device battery 120. In the case where the power source is determined to be the device battery 120, the output voltage from the device battery 120 may match the output voltage from the undersized power adapter 104, allowing power to be drawn from the device battery 120.

Figure 2:
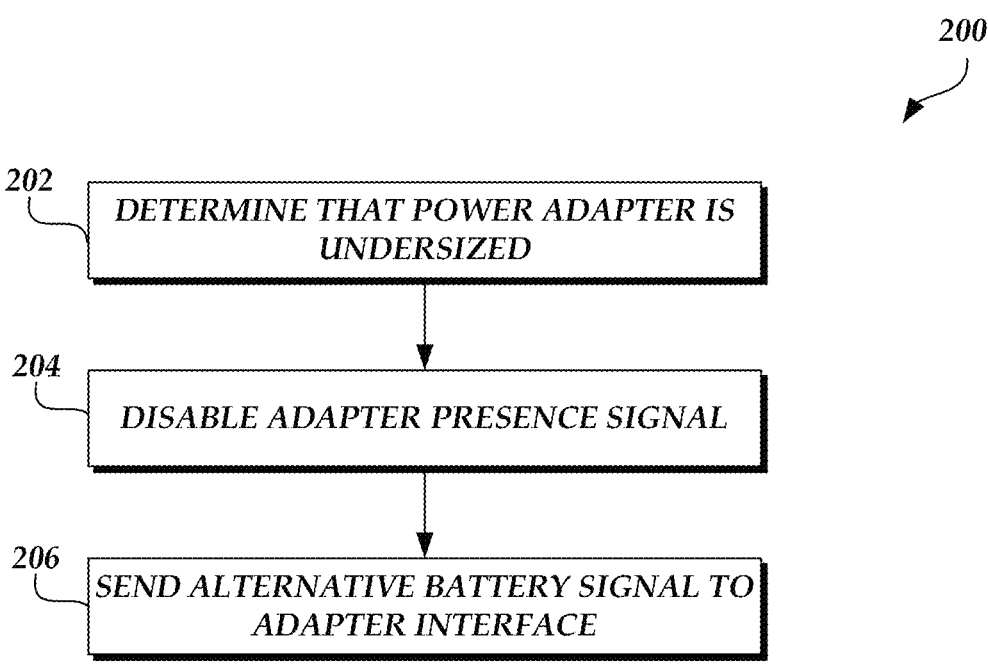
FIG. 2 is an example flow diagram depicting a process for treating an undersized power adapter as an alternative battery source of a computing device, such as the computing device of FIG. 1.

FIG. 2 is an example flow diagram depicting a process for treating an undersized power adapter as an alternative battery source of a computing device, such as the computing device of FIG. 1. In some examples, routine 200 may be executed by controller 112 of computing device 102.

At block 202, controller 112 determines that a power adapter is undersized. As noted above, an undersized adapter may refer to a power adapter that is configured to supply current at a level lower than a level supported by the computing device 102 specifications. In some examples, controller 112 may determine that the power adapter 104 is undersized when the power adapter 104 has a power rating that is less than a nominal power rating of the computing device.

At block 204, controller 112 disables an adapter presence signal. In some examples, controller 112 may disable the ADP_PRES signal sent to the processor 114 to allow an undersized power adapter 104 to power the computing device 102 as an alternative or secondary battery source.

At block 206, controller 112 sends an alternative battery signal to adapter I/O 108. As shown in FIG. 1, controller 112 may be communicatively coupled to adapter I/O 108. In some examples, controller 112 may send a signal prompting the adapter I/O 108 to allow undersized power adapter 104 to charge the device battery 120 through charger 110.

Figure 3:
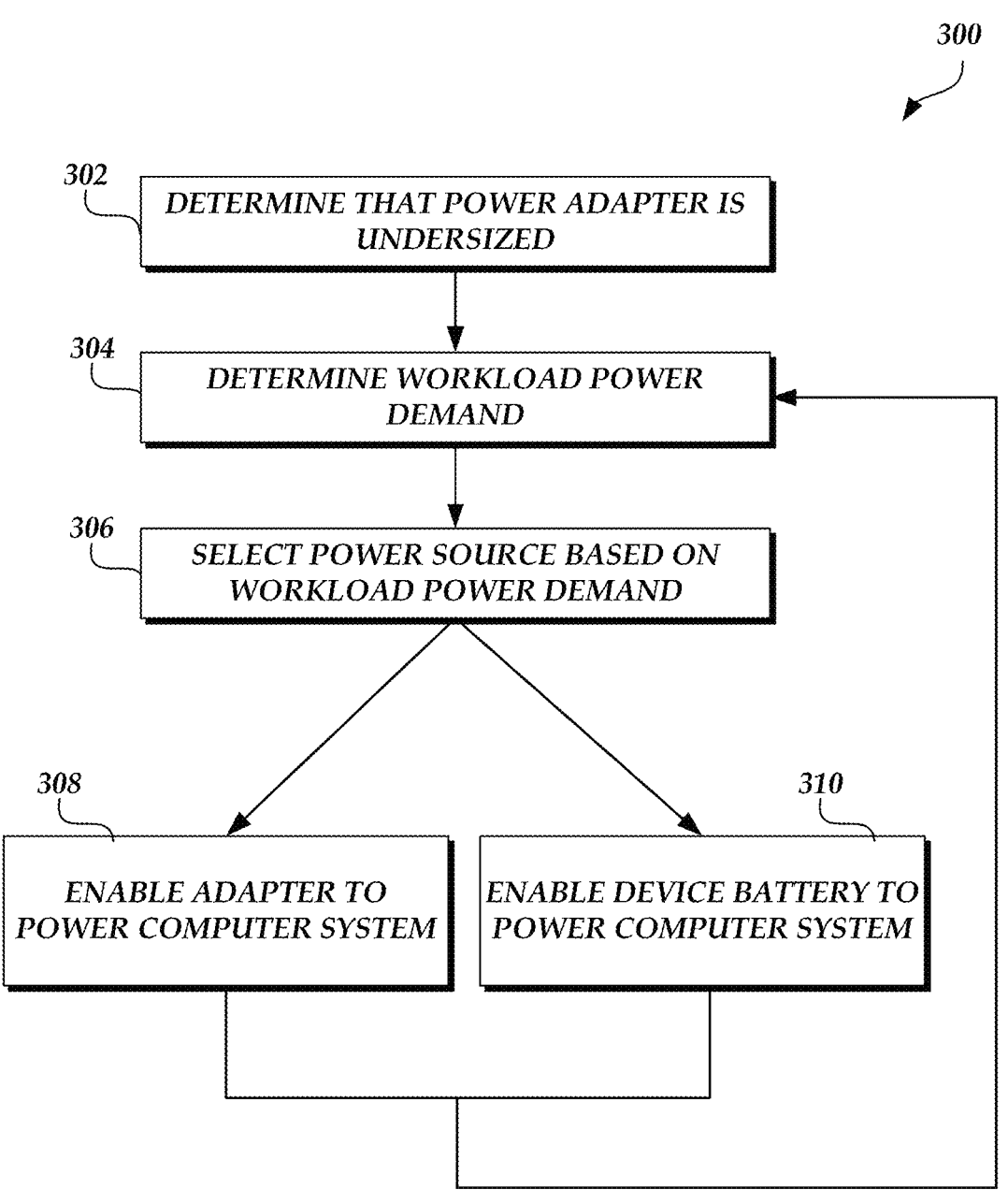
FIG. 3 is an example flow diagram depicting a process for determining a power source between an undersized power adapter and a device battery for a computing device, such as the computing device of FIG. 1.

FIG. 3 is an example flow diagram depicting a process for determining a power source between an undersized power adapter 104 and a device battery 120 for a computing device, such as the computing device 102 of FIG. 1. In some examples, routine 300 may be executed by controller 112 of computing device 102.

At block 302, controller 112 determines that power adapter 104 as undersized. As noted above, an undersized adapter may refer to a power adapter that is configured to supply current at a level lower than a level supported by the computing device 102 specifications. In some examples, controller 112 may determine that the power adapter 104 is undersized when the power adapter 104 has a power rating that is less than a nominal power rating of the computing device.

In some examples, controller 112 may identify a power adapter via information about the power adapter 104, such as maximum current output, voltage, connector type, etc., sent by power adapter I/O 108.

At block 304, controller 112 determines a workload power demand. As noted above, a workload power demand may refer to an amount of computing resources and/or a time needed to complete a task or generate an outcome, such as in the form of a required current level. In some examples, the workload power demand includes a present workload power demand and an upcoming workload power demand. In some examples, the workload power demand is based on a workload type, wherein the workload type includes a computing device state change, a process, or an application.

At block 306, controller 112 selects a power source based on the workload power demand. In some examples, controller 112 may determine a power source based on whether undersized power adapter 104 can sufficiently handle the workload of computing device 102. For example, controller 112 may compare a capability of the undersized power adapter 104 (e.g., wattage) with the workload power demand (e.g., required power consumption) in order to determine whether the undersized power adapter 104 can sufficiently handle the workload power demand. In other examples, controller 112 may determine a power source based on the upcoming workload type. For example, controller 112 may receive information from the processor 114 relating to an upcoming power state change, such as from an active state to an idle state. In this example, controller 112 may automatically set the power source to the undersized power adapter 104. In another example, controller 112 may receive information from the processor 114 relating to an upcoming process, such as the opening of a video editing application, which contains many tools and processes that may consume a large amount of power. In this case, controller 112 may automatically set the power source to the device battery 120 instead of the power adapter 104. In some examples, the controller 112 may select the power source based on when the power workload demand is higher or lower than a threshold. In some examples, the threshold may correspond to a minimum power demand.

In some examples, selecting the power source for the computing device based on the workload power demand comprises determining whether the power adapter has an adapter power rating that meets the workload power demand.

At block 308, controller 112 may enable the power adapter 104 to power the computing device 102. In some embodiments, in order to enable the power adapter 104 to power the computing device, controller 112 may disable an ADP_PRES signal to the processor 114 in order for the processor 114 to recognize adapter 104 as a battery source rather than as an adapter. In some embodiments, controller 112 may send a signal to the adapter I/O 108 in order to enable power adapter 104 to power the computing device 102.

At block 310, controller 112 may enable the device battery 120 to power the computing device 102. In some embodiments, if power adapter 104 is connected to computing device 102 but controller 112 has determined to set the device battery 120 as the power source, controller 112 may not disable the ADP_PRES signal in order for the processor 114 to identify the power adapter 104 as undersized and block charging capability.

In some embodiments, controller 112 may monitor the current and upcoming workload power demand of computing device 102. In some embodiments, controller 112 may switch the power source based on the determined workload power demand and repeat any of the steps outlined in blocks 302-310 as shown in FIG. 3.

In some examples, routine 300 further comprises enabling the power adapter to power the computing device as an alternative battery.

In some examples, routine 300 further comprises monitoring the workload power demand of the computing device. In some examples, routine 300 further comprises determining that the power adapter has an adapter power rating that is less than the workload power demand. In some examples, routine 300 further comprises switching the power source of the computing device from the power adapter to the battery of the computing device.

In some examples, routine 300 further comprises comprising selecting both the power adapter and the battery of the computing device as the power source during a transition period.

Figure 4:
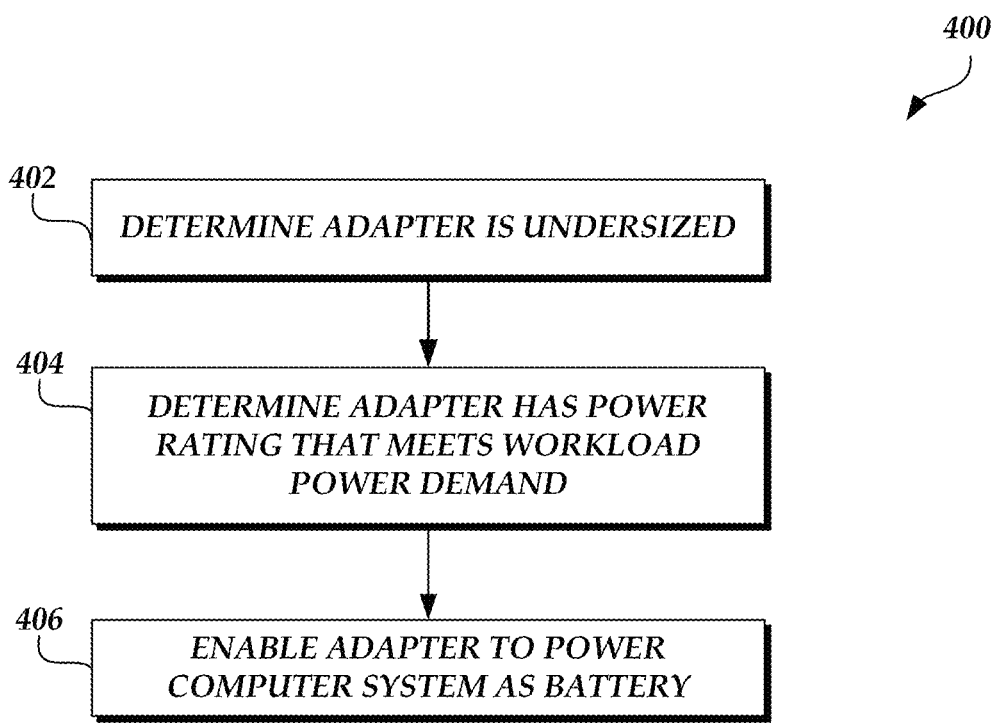
FIG. 4 is an example flow diagram depicting a process for enabling an undersized power adapter to power a computing device, such as the computing device of FIG. 1.

FIG. 4 is an example flow diagram depicting a process for enabling an undersized adapter to power a computing device, such as the computing device 102 of FIG. 1. In some examples, routine 400 may be executed by controller 112 of computing device 102.

At block 402, controller 112 determines an adapter is undersized. In some examples, controller 112 determines that a power adapter attached to a power port of a computing device has an adapter power rating that is less than a nominal power rating of the computing device.

At block 404, controller 112 determines a power adapter 104 has a power rating that meets a workload power demand. In some examples, the workload power demand includes a present workload power demand and an upcoming workload power demand. In some examples, the workload power demand is based on a workload type, wherein the workload type includes a computing device state change, a process, or an application.

At block 406, controller 112 enables a power adapter 104 to power computer device 102 as a battery.

In some examples, routine 400 further comprises determining power source for the computing device based on the workload power demand comprises determining whether the power adapter has an adapter power rating that meets the workload power demand.

In some examples, routine 400 further comprises monitoring a workload power demand of the computing device. In some examples, routine 400 further comprises determining that the power adapter has an adapter power rating that is less than the workload power demand. In some examples, routine 400 further comprises switching a power source of the computing device from the power adapter to a battery of the computing device.

In some examples, routine 400 further comprises selecting both the power adapter and a battery of the computing device as a power source during a transition period. In some examples, the transition period may include a period in which the power source is switched between the power adapter and the battery of the computing device.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of electronic devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable electronic device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached FIGs. should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A method, comprising:
   determining that a power adapter attached to a power port of a computing device has an adapter power rating that is less than a nominal power rating of the computing device;
   determining a workload power demand of the computing device;
   selecting a power source for the computing device based on the workload power demand, wherein the power source is selected from the power adapter or an internal battery of the computing device;
   suppressing an adapter presence signal, wherein the adapter presence signal indicates that the power adapter is attached to the power port of the computing device; and
   sending an alternative battery presence signal to cause the computing device to identify the power adapter as an alternative battery.

2. The method of claim 1, wherein when the internal battery is selected as the power source, disabling power input from the power adapter.

3. The method of claim 1, wherein the workload power demand includes a present workload power demand and an upcoming workload power demand.

4. The method of claim 1, wherein the workload power demand is based on a workload type, wherein the workload type includes a computing device state change, a process, or an application.

5. The method of claim 1, wherein selecting the power source for the computing device based on the workload power demand comprises determining whether the power adapter has an adapter power rating that meets the workload power demand.

6. The method of claim 1, further comprising in response to a determination that the power adapter has an adapter power rating that is less than the workload power demand, selecting the internal battery as the power source.

7. The method of claim 1, further comprising selecting both the power adapter and the internal battery as the power source during a transition period.

8. A computing device comprising:
   a power port;
   a chipset;
   a controller to:

determine that a power adapter is attached to the power port, wherein the computing device has a nominal power rating;

determine that the power adapter has an adapter power rating that is less than the nominal power rating;

suppress an adapter presence signal to the chipset, wherein the adapter presence signal indicates that the power adapter is attached to the power port of the computing device; and send an alternative battery presence signal to the chipset to cause the computing device to identify the power adapter as an alternative battery.

9. The computing device of claim 8, wherein the alternative battery presence signal indicates to an operating system of the computing device that the power adapter is an alternative battery power source.

10. The computing device of claim 8, wherein the controller is to:

determine a workload power demand of the computing device; and select the power adapter as a power source for the computing device when the workload power demand is less than a threshold.

11. The computing device of claim 10, wherein the workload power demand includes a present workload power demand and an upcoming workload power demand.

12. The computing device of claim 10, further comprising a graphics processing unit (GPU), wherein the GPU is to operate at a throttled performance level when the power adapter is selected as the power source.

13. The computing device of claim 10, wherein the controller is to:

monitor the workload power demand; and disable the power adapter when the workload power demand is higher than the threshold.

14. The computing device of claim 13, further comprising an internal battery, wherein the controller is to select the internal battery as the power source when the workload power demand is higher than the threshold.

15. A non-transitory computer-readable storage medium comprising instructions that when executed cause a controller of a computing device to:

determine that a power adapter attached to a power port of a computing device has an adapter power rating that is less than a nominal power rating of the computing device;

determine that the power adapter has an adapter power rating that meets a workload power demand; and identify the power adapter as a battery to the computing device to power the computing device.

16. The non-transitory computer-readable storage medium of claim 15, wherein the instructions when executed further cause the controller to suppress a signal that identifies the power adapter as a power adapter.

17. The non-transitory computer-readable storage medium of claim 15, wherein the workload power demand includes a present workload power demand and an upcoming workload power demand.

18. The non-transitory computer-readable storage medium of claim 15, wherein the instructions when executed further cause the controller to: determine power source for the computing device based on the workload power demand comprises determining whether the power adapter has an adapter power rating that meets the workload power demand.

19. The non-transitory computer-readable storage medium of claim 16, wherein the instructions when executed further cause the controller to:

monitor a workload power demand of the computing device;

determine that the power adapter has an adapter power rating that is less than the workload power demand; and switch a power source of the computing device from the power adapter to an internal battery of the computing device.

20. The computing device of claim 11, wherein the upcoming workload comprises one or more of: a power up, a power down, or a low power mode.

* * * * *